United States Patent [11] 3,599,775

| [72] | Inventor | Helmut Torwegge<br>Bad Oeynhausen, Germany |
|---|---|---|
| [21] | Appl. No. | 826,619 |
| [22] | Filed | May 21, 1969 |
| [45] | Patented | Aug. 17, 1971 |
| [73] | Assignee | Franz Torwegge Maschinenfabrik |
| [32] | Priority | June 1, 1968 |
| [33] | | Germany |
| [31] | | P 17 56 534.3 |

[54] CONVEYOR SYSTEM FOR PLATELIKE WORKPIECES
7 Claims, 4 Drawing Figs.

[52] U.S. Cl. ........................................................ 198/21
[51] Int. Cl. ................................................. B65g 47/42
[50] Field of Search ............................................ 198/21,
  102, 167; 271/DIG. 4, DIG. 5, 49; 144/242—245

[56] References Cited
UNITED STATES PATENTS

| 1,737,762 | 12/1929 | Howe ........................... | 198/21 X |
| 2,681,130 | 6/1954 | Atwood ........................ | 198/21 |
| 3,176,822 | 4/1965 | Schikofsky ................... | 198/21 |

*Primary Examiner*—Edward A. Sroka
*Attorney*—R. G. Stephens

ABSTRACT: A conveyor system for platelike workpieces such as veneers, comprising a unilateral longitudinal conveyor located in the plane of movement of said workpieces, a plurality of transverse conveyors associated with said longitudinal conveyor, and means for controlling the longitudinal and transverse conveyor movements alternately, said means including a scanning device located in the vicinity of said longitudinal conveyor.

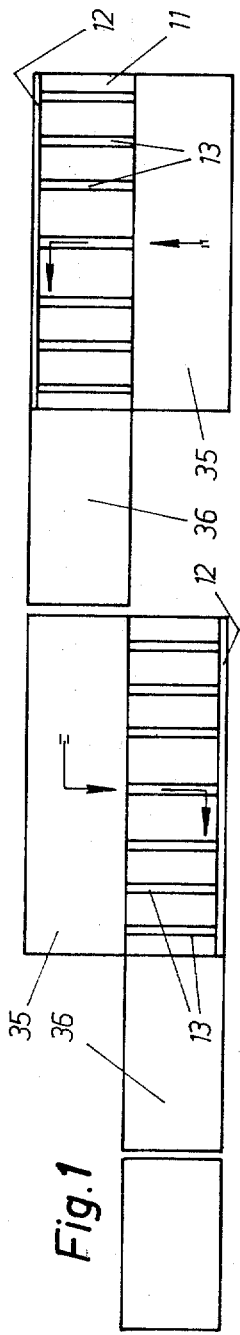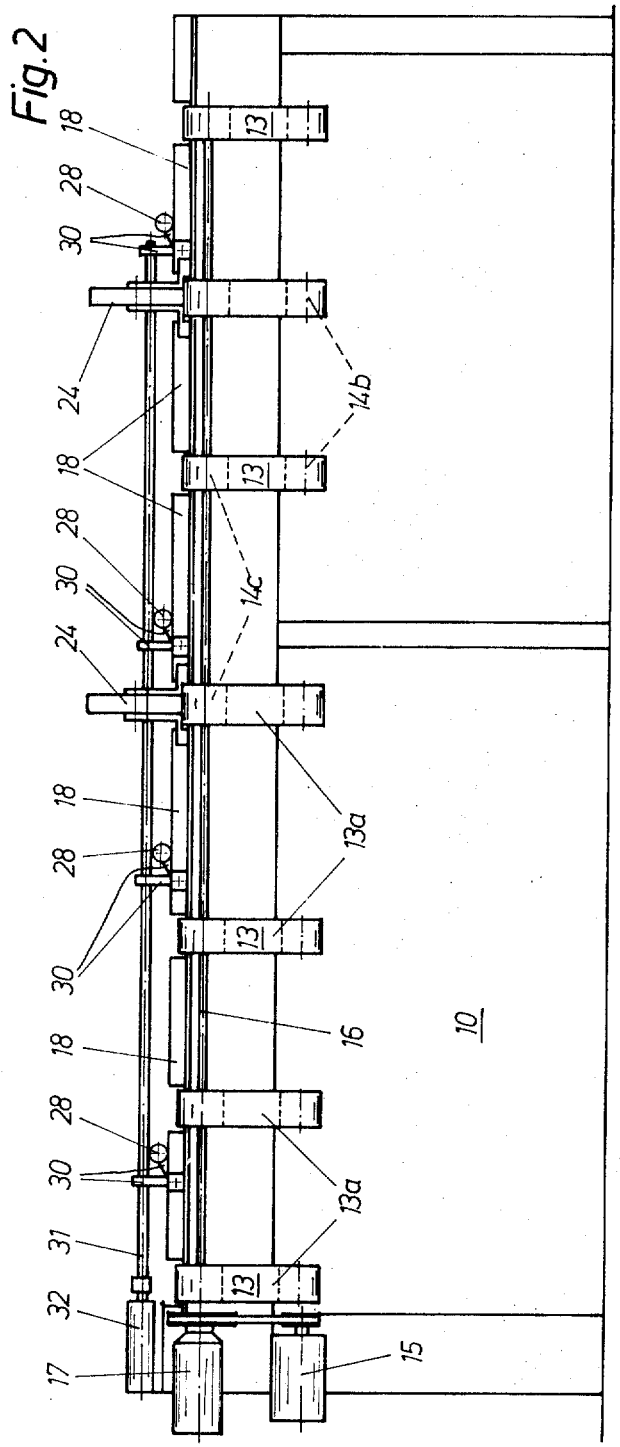

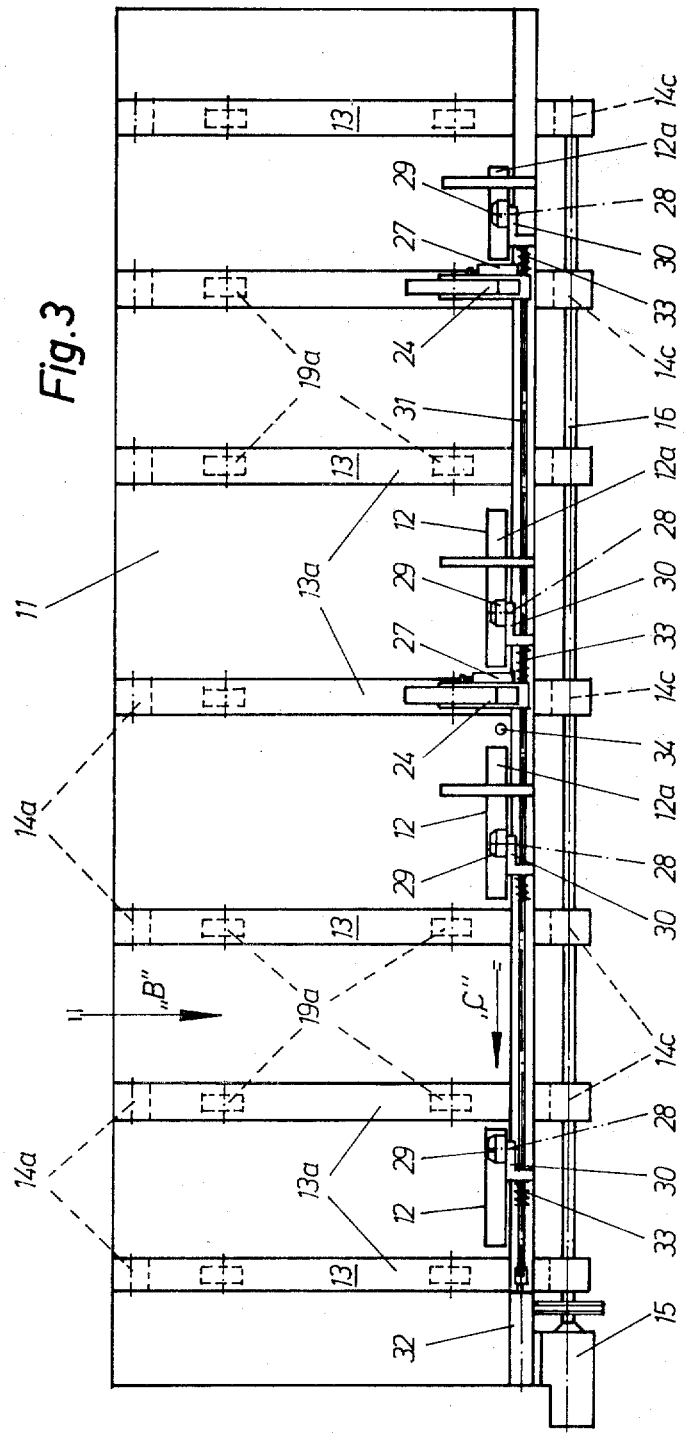

CONVEYOR SYSTEM FOR PLATELIKE WORKPIECES

This invention concerns a conveyor system by which platelike workpieces such as veneers can be moved in several directions in one plane.

Conveyor systems for platelike workpieces are known in various forms. With these systems the workpieces to be moved by a conveyor can be moved only in one direction. With the use of such conveyor systems in a processing plant in the wood processing industry, difficulties arise, since additional, complicated and expensive devices or manual work are necessary for changing the direction of the workpieces.

The object of the present invention is to provide a simply constructed and reliable conveyor system for platelike workpieces, which while avoiding the previous disadvantages, makes it possible to convey the workpieces in several directions in a plane and enable it to be used in a processing plant while avoiding manual work.

According to the present invention, a conveyor system for platelike workpieces, such as veneers, incorporating a conveyor moving the workpieces in one direction, is characterized in that the conveyor is provided in the plane of movement for the workpieces as a unilateral longitudinal conveyor, several transverse conveyors being associated with this longitudinal conveyor, the longitudinal and the transverse conveyors being alternately controlled by a scanning mechanism provided in the vicinity of the longitudinal conveyor.

In a preferred embodiment the transverse conveyors are provided at right angles to the longitudinal conveyor arranged at the side of the system at equal or differently spaced intervals over the length of the longitudinal conveyor.

The longitudinal conveyor is preferably formed either as a conveyor belt extending over the entire length of the system and passing near the transverse conveyors, or a several conveyor chains, belts, rollers or the like, arranged one behind the other in a straight line at spaced intervals; the transverse conveyors may be arranged with an end portion engaging in the longitudinal conveyor.

The transverse conveyors are preferably formed as endless conveyor belts or the like, provided with their upper run near a supporting surface so as to be adjustable in height and the run of the longitudinal conveyor may be arranged in the plane of the supporting surface.

The scanning device may be formed by mechanical and/or electrical control devices, preferably by two photocells arranged below the conveying run of the transverse and the longitudinal conveyors, in the external marginal area of the longitudinal conveyor.

The transverse conveyors may each be provided with lower lifting rollers and upper pressure rollers, and the longitudinal conveyor with upper pressure rollers; these lifting and pressure rollers may be pivotably journaled by pressure devices, such as hydraulic cylinders which are moved synchronously by means of the scanning device.

The conveyor system of the present invention for platelike workpieces is characterized by a simple construction and reliable automatic operation, free from breakdown. The workpieces to be conveyed are moved automatically in two different directions and no manual operations are necessary.

This system is particularly suitable for incorporating in processing plants (finishing mills) in the wood-processing industry, since the workpieces to be conveyed can be introduced into the processing devices with the desired type of motion and with the edge to be treated in the correct position.

Since the workpieces arrive individually on the conveyor system and with their longitudinal edge aligned by a stop for changing direction, accurate introduction of the workpieces into the next processing machine is ensured, with the longitudinal edge to be treated in correct alignment.

An embodiment of the present invention is illustrated in the accompanying drawings in which:

FIG. 1 is a plan view of a processing plant for plate-shaped workpieces, having two conveyor systems arranged in spaced series relationship, adjacent to each other with an interposed processing device connected downstream of the plant.

FIG. 2 is a front view of the same conveyor system.

FIG. 3 is a plan view of the same conveyor system and

Figure 4:
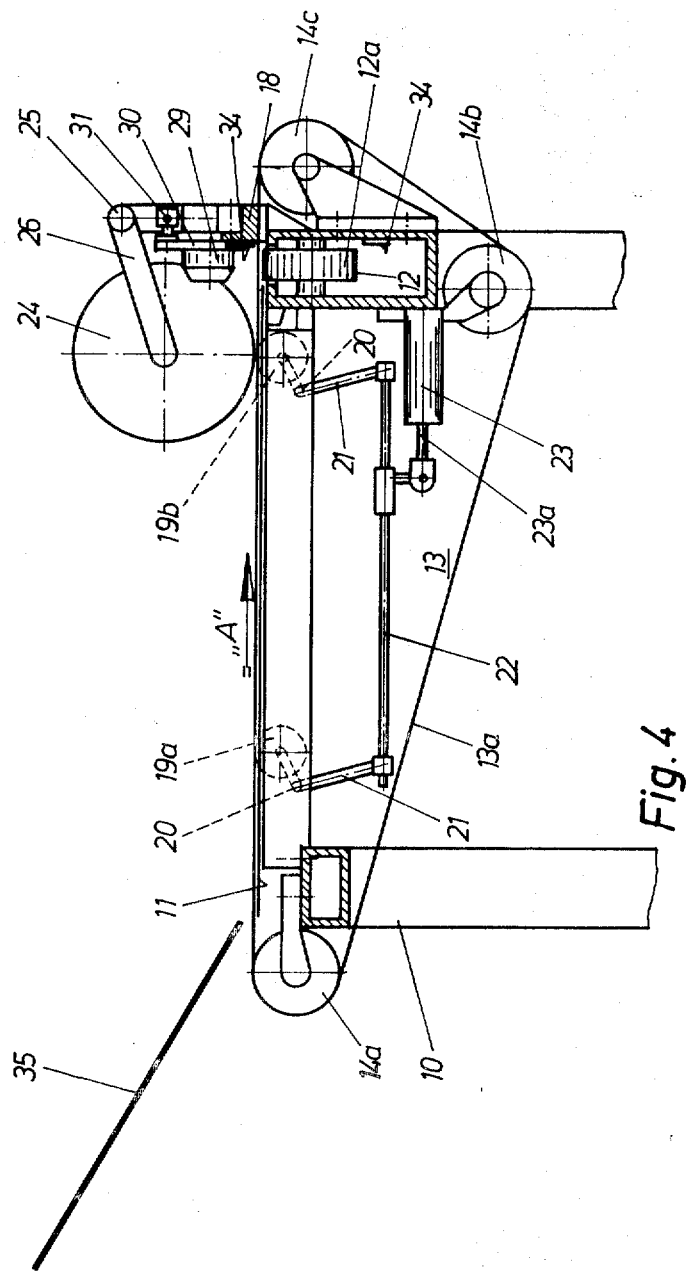
FIG. 4 is a front view of the same conveyor system, shown partly in section.

A conveyor system for platelike workpieces, such as veneers has a machine frame 10 provided with an upper horizontal surface 11, such as a table top. The support surface 11 of this system has a basic rectangular form, and a longitudinal conveyor 12 as conveyor device moving the workpieces in one direction, near one longitudinal edge.

Associated with this longitudinal conveyor 12 are several transverse conveyors 13 which are located at a predetermined angle, preferably a right angle, relative to the longitudinal conveyor 12. The transverse conveyors 13 are spaced at equal or different distances apart and distributed over the entire length of the longitudinal conveyor 12.

The longitudinal conveyor 12 is formed by several conveyor chains 12a, belts, rollers or the like, provided one behind the other in a straight line with a space between them, and forming a conveyor mechanism. Engaging between these conveyor chains 12a, are the end portions of the transverse conveyors 13, so that the transverse conveyors 13 form, with a clearance, a cross with the interrupted longitudinal conveyor 12 in a side portion of the bearing surface 11 (See FIG. 3). The longitudinal conveyor 12 may also extend over the entire length of the system, being inwardly deflected in the region of the transverse conveyors 13 and extending between them.

The transverse conveyors 13 are formed by conveyor belts 13a, chains or the like, endlessly circulating over several guide pulleys 14a, 14b, 14c which are provided in the frame 10 of the machine.

The upper run of the longitudinal conveyor 12 (conveyor chains 12a) extends with the support surface 11 in a horizontal plane and the upper runs of the transverse conveyors 13 are adjustable in height in the region of the support surface 11, so that these runs are displaceable above and below the support surface 11 (See FIG. 4).

The transverse conveyors 13 are driven by a driving means 15 such as a motor, provided at the front of the conveyor system, which motor drives the guide pulley 14c of each conveyor belt 13a, disposed externally of the side region of the machine, by way of a shaft 16 extending approximately over the entire length of the system.

The individual conveyor chains 12a of the longitudinal conveyor 12 are uniformly and synchronously driven by a driving device 17, such as a motor, by way of bevel gears, said driving device 17 being arranged at the side of the machine frame 10 carrying the driving device 15. A stop 18, such as a ledge, extending along the entire length of the system, is located along the outside edge of the longitudinal conveyor 12, which stop is formed of separate ledge sections, provided between the transverse conveyors 13 and located one behind the other in a straight line.

This stop 18 is provided on the machine frame 10 at right angles to the support surface 11 and is disposed away from the side of the outer edge of the longitudinal conveyor, said stop 18 extending parallel to the transporting run of the longitudinal conveyor 12.

The workpieces to be transported are movable in two directions in a horizontal plane by means of this conveyor system, the transverse conveyors 13 moving the workpieces towards the longitudinal conveyor 12 by which they are conveyed further at right angles to the direction of movement of the transverse conveyors.

In order to move the workpieces by a transverse conveyor 13, its upper run must be disposed above the support surface 11. Two lifting rollers 19a and 19b of each conveyor belt 13a arranged below the upper run make it possible to raise the upper run so that this run of the transverse conveyor 13 moves with a clearance above the support surface 11 and carries the workpieces to be transported.

These lifting rollers 19a, 19b are each mounted to pivot about bearing points 20 and are rigidly connected by lever systems 21 and a connecting rod 22 to a pressure mechanism, such as a hydraulic cylinder 23 (see FIG. 4). During the displacement of the piston rod 23a of the hydraulic cylinder 23, the system of levers 21 is swiveled round the bearing points 20 and the rollers 19a, 19b are moved up or down about the bearing point 20 and then extend by their cylindrical surfaces above or below the support surface 11. The two guide pulleys 19a, 19b of each conveyor belt 13a are spaced apart one behind the other, the guide pulley 19a is disposed on the feeding side edge of the machine frame 10, and the guide pulley 19b has a certain clearance from the longitudinal conveyor 12. In order to bring the workpieces into contact with the stop 18 by means of the transverse conveyors 13 or to bring the workpieces with their longitudinal edge exactly in contact with the stop 18, a pressure roller 24 is provided as draw-in roller above the individual lifting rollers 19b and cooperates with the lower lifting roller 19b to draw the workpieces against the stop 18 with their edges in alignment therewith. It is preferable to provide at least two lifting rollers 19b with upper pressure rollers 24; these pressure rollers 24 are arranged to pivot about a bearing point 25 and connected by a lever system 26 to a pressure mechanism, such as a hydraulic cylinder 27. During the displacement of the piston rod of the hydraulic cylinder 27 the pressure roller 24 is moved about its bearing point 25 in the direction of the lifting roller 19b or away from the lifting roller 19b. Above each conveyor chain 12a of the longitudinal conveyor 12 a pressure roller 29 is journaled to pivot about a bearing point 28, and presses the workpiece firmly onto the conveyor chains 12a for conveying the workpiece by means of the longitudinal conveyor 12. These pressure rollers 29 are connected by a lever system 30 to a push rod 31 of a pressure mechanism such as a hydraulic cylinder 32 so that, during displacements of the push rod 31, all the pressure rollers 29 are pivoted about their bearing point 28, towards the longitudinal conveyor 12 and away from the longitudinal conveyor 12. This hydraulic cylinder 32 can be constructed as a double-acting cylinder; alternatively compression springs 33 may be arranged around the push rod 31 near the lever system 28, which springs return the push rod 31 to the starting position. By means of these compression springs 33 the pressure rollers 29 can be moved out of the working position (pressure position) into the inoperative position.

In order to control the longitudinal conveyor 12 and the transverse conveyors 13 at least one scanning device 34 is arranged in the vicinity of the longitudinal conveyor 12 and determines the operations (conveying movements) of the longitudinal conveyor 12 and the transverse conveyors 13. This scanning device 34 may be formed as a mechanical and/or electrical switching device; preferably the scanning device 34 is two photocells arranged at a crossing point above and below the transverse conveyors 13 and a longitudinal conveyor 12. These photocells are arranged in the external marginal area of the longitudinal conveyor 12 near the stop 18, or secured thereto.

The scanning device 34 may also be formed as pneumatic or hydraulic control devices.

Said scanning device 34 controls the pressure medium cylinders 23, 27 and 32 when the workpiece comes into contact with them. All the hydraulic cylinders 23, 27 and 32 are connected together and are synchronously displaceable.

The above described conveyor system operates as follows: the workpieces placed by hand or by a separate device individually on the continuously rotating transverse conveyors 13 located with their conveying length or run above the support surface 11, are moved by the conveyor belts 13a in a straight line towards the longitudinal conveyor 12. The workpieces are fed from one side of the system and are moved to the opposite side provided with the unilateral longitudinal conveyor 12; the transverse conveyors 13 circulate in the direction of the arrow A (see FIG. 4).

The lifting rollers 19a, 19b maintain the conveying length or run of the transverse conveyors 13 above the support surface 11. After the workpiece is engaged by the upper pressure rollers 24, it is pressed against the stop 18 and aligned so that the longitudinal edge of the workpiece is in contact with the stop 18 over its entire length. When the workpiece strikes against the stop 18, the scanning device 34 is brought into action since the ray of light from the photocell is broken by the workpiece. The scanning device 34 then controls the movement of the hydraulic cylinders 23, 27 and 32, the hydraulic cylinders 23 moving the lifting rollers 19a, 19b and thus the upper run of the transverse conveyor 13 downwardly below the support surface 11, the hydraulic cylinders 27 swiveling the pressure rollers 24 about their bearing point 25 upwardly and the hydraulic cylinder 32 swivels all the pressure rollers 29 on the longitudinal side of the conveyor about their bearing points 28. These pressure rollers 29 then press the workpiece firmly on the individual conveyor chains 12a forming the longitudinal conveyor 12 and continuously rotating, which chains then move the workpiece resting on the support surface 11 and held clamped at one end (by an edge) between the longitudinal conveyor 12 and pressure rollers 29 further on in the system at right angles to the first conveyor.

The conveyors are indicated in FIG. 3 of the drawings by the arrows B (transverse movement) and C (longitudinal movement).

After the workpiece has left this conveyor device, the transverse conveyors 13 are returned to the starting position again by means of the lifting rollers 19a, 19b and the pressure rollers 24 and 29.

For feeding the workpieces the conveyor system is provided on the receiving side with a chute 35 which is arranged at an oblique angle to the plane of movement of the system (see FIG. 4).

The conveyor system of the present invention may be associated with special processing apparatus, such as jointing machines or the like, and form with these processing machines a processing system (finishing mill). In the processing plant shown in FIG. 1 of the drawings, a conveyor system is associated with a processing apparatus in a straight extension in which one side (longitudinal edge) of the workpieces is being processed.

After the workpiece has left this processing apparatus 36, it moves by way of a chute 35 onto a second identical but mirror image conveyor system, by which the workpiece is introduced into a second processing apparatus 36 which then processes the other side (longitudinal edge) of the workpiece.

The system of the present invention is simple to design, easy to manufacture and reliable in operation without breakdown. By means of this system platelike workpieces can be moved in one plane in several, preferably two, directions, the movement of the workpieces being obtained by means of alternately operating transverse and longitudinal conveyors.

The conveyor system works automatically and effects the change of direction of the workpieces automatically so that manual work is avoided to a very considerable extent. The preferred scanning device ensures reliable changeover and thus, the alternating operation of the two conveyors.

It is within the scope of the present invention to provide the mounting of the lifting and pressure rollers, the construction of its pressure devices and the arrangement of the conveyors and the design thereof in a different manner; furthermore, the scanning device may be differently designed and the drive of the transverse conveyors and of the longitudinal conveyor can be obtained from a common driving mechanism. Moreover, it is within the scope of the invention to replace several transverse conveyors by one comparatively wide transverse conveyor or to provide a transverse conveyor extending over the entire length of the system, one end of which terminates within or near the longitudinal conveyor.

I claim:

1. A conveyor system for moving flat workpieces in first and second directions, comprising, in combination: a supporting table having a plurality of first surfaces lying in a common plane and spaced from each other in said first direction; a plurality of first conveyor means each positioned in the space between a respective pair of said first surfaces of said table, each comprising an endless belt means having an upper course extending in said second direction, means for driving said endless belt means, and control means for raising and lowering said upper course above and below said common plane of said first surfaces of said table; stop means comprising a plurality of second surfaces carried on said table, said second surfaces being aligned in a row extending in said first direction near one edge of each of said first surfaces, and said second surfaces extending above said common plane of said plurality of first surfaces; a plurality of second conveyor means each positioned in a respective one of said first surfaces of said table, each comprising an endless belt means having an upper course extending in said first direction in a plane above said common plane of said first surfaces of said table, and means for driving said endless belt means of said second conveyor means; and sensing means adjacent said stop means for operating said control means to lower said upper courses of said first conveyor means to positions below the plane of said upper courses of said second conveyor means.

2. A system according to claim 1 in which said means for driving said endless belt means of said second conveyor means comprises a shaft extending in said first direction and a plurality of bevel gear means spaced along said shaft and connected to drive respective ones of said second conveyor means.

3. A system according to claim 1 in which the endless belt means of all of said second conveyor means comprises a single endless belt means deflected downwardly below the plane of its upper course at the spaces between said first surfaces of said table.

4. A system according to claim 1 wherein each of said first conveyor means includes a pressure roller pivotally mounted above said first surfaces of said table and connected to be pivoted as said first conveyor means are raised and lowered.

5. A system according to claim 1 wherein each of said second conveyor means includes a pressure roller pivotally mounted above said first surfaces of said table, and means for pivoting said pressure rollers.

6. A system according to claim 1 in which said first direction is perpendicular to said second direction.

7. A system according to claim 1 wherein each of said endless belt means comprises an endless belt looped around a plurality of rollers and wherein said control means for raising and lowering said upper courses of said first conveyor means comprises a plurality of hydraulic cylinders and a plurality of levers connected between said hydraulic cylinders and said rollers.